US011437836B2

(12) United States Patent
Maruno (10) Patent No.: US 11,437,836 B2
(45) Date of Patent: Sep. 6, 2022

(54) BATTERY DEVICE

(71) Applicant: HONDA MOTOR CO., LTD., Tokyo (JP)

(72) Inventor: Naoki Maruno, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 164 days.

(21) Appl. No.: 16/739,151

(22) Filed: Jan. 10, 2020

(65) Prior Publication Data

US 2020/0235598 A1 Jul. 23, 2020

(30) Foreign Application Priority Data

Jan. 22, 2019 (JP) .............................. JP2019-008305

(51) Int. Cl.
*H02J 7/00* (2006.01)

(52) U.S. Cl.
CPC ........ *H02J 7/0068* (2013.01); *H02J 7/00045* (2020.01); *H02J 7/0045* (2013.01)

(58) Field of Classification Search
CPC ..... H02J 7/0068; H02J 7/00045; H02J 7/0045
USPC ....................................................... 320/112
See application file for complete search history.

(56) References Cited

U.S. PATENT DOCUMENTS

| 2014/0253021 A1* | 9/2014 | Luke ..................... H02J 7/0013 320/107 |
| 2016/0145903 A1* | 5/2016 | Taylor ................... H02J 7/0021 701/2 |
| 2020/0274206 A1* | 8/2020 | Maruno ............... G01R 31/392 |

FOREIGN PATENT DOCUMENTS

| CN | 107679938 | * 2/2018 |
| JP | 19-275639 | 10/1997 |
| JP | 2011-131805 | 7/2011 |
| JP | 2013-243913 | 12/2013 |
| JP | 2014-082137 | 5/2014 |
| JP | 2016-143472 | 8/2016 |
| JP | 2018-093713 | 6/2018 |
| WO | 2017/090368 | 6/2017 |

OTHER PUBLICATIONS

Japanese Office Action for Japanese Patent Application No. 2019-008305 dated Mar. 8, 2022.

* cited by examiner

*Primary Examiner* — Richard V Muralidar
(74) *Attorney, Agent, or Firm* — Amin, Turocy & Watson, LLP (57) ABSTRACT

A battery device includes a power storage unit, a signal input unit to which a security signal is input, and a switching unit that enables or disables an electrical connection of the power storage unit to an electric power input/output terminal according to a signal input to the signal input unit, and when a release signal that is one type of the security signal is input to the signal input unit, the switching unit enables an electrical connection of the power storage unit to the electric power input/output terminal.

6 Claims, 5 Drawing Sheets

BATTERY DEVICE

CROSS-REFERENCE TO RELATED APPLICATION

Priority is claimed on Japanese Patent Application No. 2019-008305, filed Jan. 22, 2019, the content of which is incorporated herein by reference.

BACKGROUND OF THE INVENTION

Field of the Invention

The present invention relates to a battery device.

Description of Related Art

Batteries (secondary batteries) such as lithium-ion batteries are used in electric vehicles such as electric cars and hybrid cars. In order to ensure a stable supply of batteries in the future, it is thought that it will be effective to actively utilize such secondary battery use. In the past, a technology for a device and a method for providing energy management and maintenance of batteries for secondary use by using a secondary service port was disclosed (e.g., refer to Japanese Unexamined Patent Application, First Publication No. 2013-243913).

SUMMARY OF THE INVENTION

However, in the related art, since it is unclear to which field such batteries can be applied when the batteries are subjected to secondary use, it is hard to guarantee appropriate secondary use.

An objective of the present invention has been realized in consideration of such circumstances and is to provide a battery device that can guarantee appropriate use during secondary use to some extent.

To solve the above-described problem and achieve the objective, the present invention employs the following aspects.

(1) A battery device according to an aspect of the present invention includes a power storage unit, a signal input unit to which a security signal is input, and a switching unit that enables or disables an electrical connection of the power storage unit to an electric power input/output terminal according to a signal input to the signal input unit.

(2) According to the aspect (1), when a release signal that is one type of the security signal is input to the signal input unit, the switching unit may enable an electrical connection of the power storage unit to the electric power input/output terminal.

(3) According to the aspect (1), when the security signal input to the signal input unit matches identification information associated with the battery device, the switching unit may enable an electrical connection of the power storage unit to the electric power input/output terminal.

(4) According to the aspect (1), the switching unit may disable an electrical connection of the power storage unit to the electric power input/output terminal when the battery device is removed from a mobile object.

(5) According to any one of the aspects (1) to (4), a wireless communication unit that receives a radio signal including the security signal may be further included.

(6) According to any one of the aspects (1) to (5), the switching unit may disable an electrical connection of the power storage unit to the electric power input/output terminal by pulling out a predetermined member from a connection element provided between the power storage unit and the electric power input/output terminal when the battery device is removed from a mobile object.

According to the aspects (1) to (6), it is possible to provide a battery device that can guarantee appropriate use during secondary use to some extent.

DETAILED DESCRIPTION OF THE INVENTION

Embodiments of a battery device of the present invention will be described below with reference to the drawings.

First Embodiment

<Vehicle>

Figure 1:
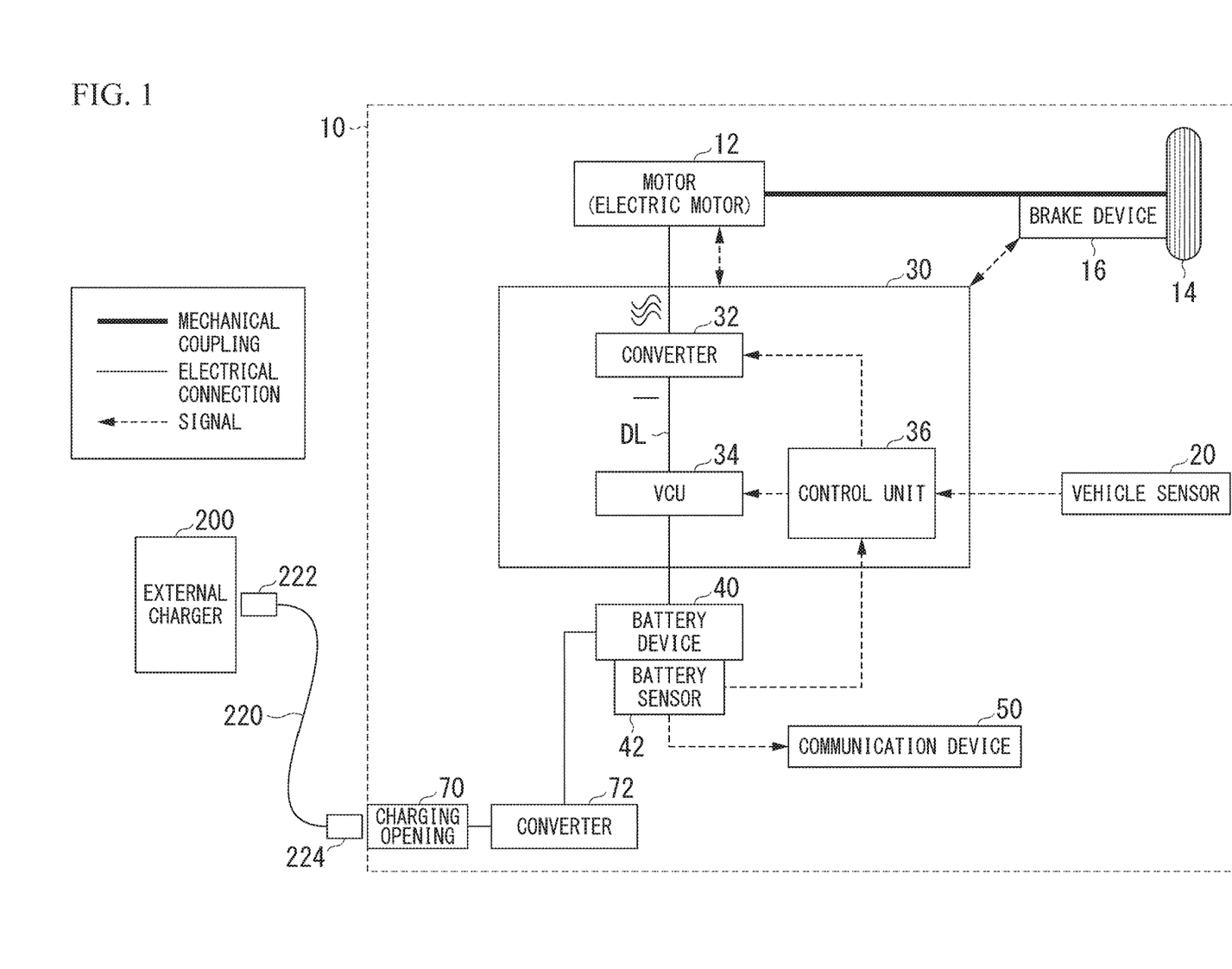
FIG. 1 is a diagram illustrating an example of a configuration of a vehicle 10 in which a battery device 40 according to a first embodiment of the present invention is mounted.

FIG. 1 is a diagram illustrating an example of a configuration of a vehicle 10 in which a battery device 40 is mounted. The vehicle 10 includes, for example, a motor 12, a drive wheel 14, a brake device 16, a vehicle sensor 20, a power control unit (PCU) (computer) 30, a battery device 40, a battery sensor 42 including a voltage sensor, a current sensor, a temperature sensor, and the like, a communication device (first communication unit) 50, a charging opening 70, and a converter 72 as illustrated in FIG. 1.

The motor 12 is, for example, a three-phase AC electric motor. A rotor of the motor 12 is coupled to the drive wheel 14. The motor 12 outputs power to the drive wheel 14 using supplied electric power. In addition, the motor 12 generates power using kinetic energy of the vehicle during deceleration of the vehicle.

The brake device 16 includes, for example, a brake caliper, a cylinder that transmits hydraulic pressure to the brake caliper, and an electric motor that generates hydraulic pressure in the cylinder. The brake device 16 may include a mechanism that transmits hydraulic pressure generated by an operation of the brake pedal to the cylinder via a master cylinder as a backup. Further, the brake device 16 is not limited to the above-described configuration and may be an electronically controlled hydraulic brake device that transmits hydraulic pressure of the master cylinder to the cylinder.

The vehicle sensor 20 includes an acceleration opening sensor, a vehicle speed sensor, and a brake depression amount sensor. The acceleration opening sensor is attached to the acceleration pedal that is an example of an operator that receives an acceleration instruction from the driver, detects an operation amount of the acceleration pedal, and outputs the operation amount to a control unit 36 as an accelerator opening. The vehicle speed sensor includes, for example, a wheel speed sensor and a speed calculator attached to each wheel, derives a speed of the vehicle (vehicle speed) by combining the wheel speeds detected by the wheel speed sensors, and outputs the result to the control unit 36 and a display device 60. The brake depression amount sensor is attached to the brake pedal, detects an operation amount of the brake pedal, and outputs the operation amount to the control unit 36 as a brake depression amount.

The PCU 30 includes, for example, a converter 32, a voltage control unit (VCU) 34, and the control unit 36. The converter 32 is, for example, an AC-DC converter. A DC side terminal of the converter 32 is connected to a DC link DL. The battery device 40 is connected to the DC link DL via the VCU 34. The converter 32 converts an AC generated by the motor 12 into a DC and outputs the DC to DC link DL. The VCU 34 is, for example, a DC-DC converter. The VCU 34 boots the power supplied from the battery device 40 and outputs the power to the DC link DL.

The control unit 36 includes, for example, a motor control unit, a brake control unit, and a battery/VCU control unit. The motor control unit, the brake control unit, and the battery/VCU control unit may each be replaced with separate control devices such as, for example, control devices such as a motor ECU, a brake ECU, and a battery ECU.

The motor control unit controls the motor 12 on the basis of output of the vehicle sensor 20. The brake control unit controls the brake device 16 on the basis of output of the vehicle sensor 20. The battery/VCU control unit computes a state of charge (SOC) of a power storage unit (which will be described below) of the battery device 40 on the basis of output of the battery sensor 42 attached to the power storage unit of the battery device 40 and outputs the result to the VCU 34 and the display device 60. The VCU 34 increases a voltage of the DC link DL according to an instruction from the battery/VCU control unit.

The power storage unit of the battery device 40 is, for example, a secondary battery such as a lithium-ion battery. The power storage unit of the battery device 40 stores electric power introduced from a charger 200 outside the vehicle 10 and performs discharge for traveling of the vehicle 10. The battery sensor 42 includes, for example, a current sensor, a voltage sensor, and a temperature sensor. The battery sensor 42 detects, for example, current values, voltage values, temperatures, and the like for charging and discharge of the power storage unit of the battery device 40. The battery sensor 42 outputs the detected current values, voltage values, temperatures, and the like to the control unit 36 and the communication device 50.

The communication device 50 includes a wireless module for connecting to a wireless communication network such as a wireless LAN, a cellular network, or the like. The wireless LAN may be a scheme, for example, Wi-Fi (registered trademark), Bluetooth (registered trademark), or Zigbee (registered trademark). The cellular network may use, for example, third generation mobile communication network (3G), fourth generation mobile communication network (Long Term Evolution or LTE (registered trademark)), fifth generation mobile communication network (5G), or the like.

The communication device 50 acquires battery usage information such as current values, voltage values, temperatures, and the like output from the battery sensors 42 and transmits the information to the outside.

The charging opening 70 is provided toward the outer side of the body of the vehicle 10. The charging opening 70 is connected to the charger 200 via a charging cable 220. The charging cable 220 includes a first plug 222 and a second plug 224. The first plug 222 is connected to the charger 200, and the second plug 224 is connected to the charging opening 70. Electricity supplied from the charger 200 is supplied to the charging opening 70 via the charging cable 220.

In addition, the charging cable 220 includes a signal cable attached to an electric power cable. The signal cable mediates communication between the vehicle 10 and the charger 200. Thus, each of the first plug 222 and the second plug 224 includes an electric power connector and a signal connector.

The converter 72 is provided between the battery device 40 and the charging opening 70. The converter 72 converts a current introduced from the charger 200 via the charging opening 70, for example, an AC current to a DC current. The converter 72 outputs the converted DC current to the battery device 40.

Figure 2:
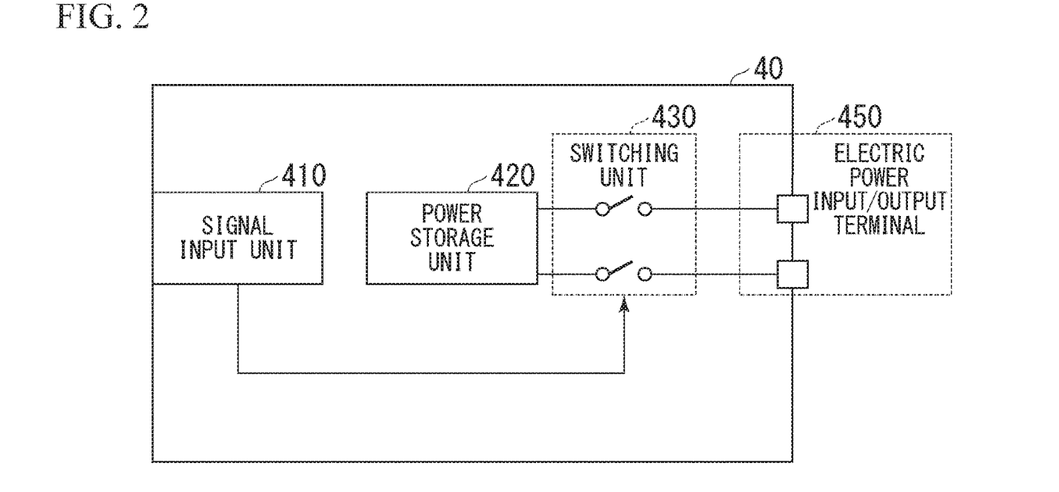
FIG. 2 is a configuration diagram of the battery device 40 according to the first embodiment of the present invention.

FIG. 2 is a configuration diagram of the battery device 40 according to the first embodiment of the present invention. The battery device 40 of the present embodiment includes, for example, a signal input unit 410, a power storage unit 420, a switching unit 430, and an electric power input/output terminal 450. These constituent elements are contained in one housing. Further, the battery sensor 42 may be contained in the housing of the battery device 40 or attached to an outside of the housing. A security signal is input to the signal input unit 410.

The signal input unit 410 includes, for example, a signal terminal (connector) to which a plug or the like is connected.

The power storage unit 420 is, for example, a lithium-ion battery, an all solid-state battery, or the like. The power storage unit 420 may be a battery pack in which battery cells are integrated.

The switching unit 430 includes, for example, a control section such as an integrated circuit (IC) that interprets details of a security signal input to the signal input unit 410, and a contactor that enables or disables an electrical connection of the power storage unit 420 to the electric power input/output terminal 450. The control section operates at all times by receiving supply of weak electric power from the power storage unit 420. The contactor may be provided between the entire power storage unit 420 and the electric power input/output terminal 450 or may be provided for each battery cell.

The control section of the switching unit 430 sets the contactor to be in an ON state (conduction state) when, for example, a security signal input to the signal input unit 410 is an enable signal (release signal) for enabling an electrical connection of the power storage unit 420 to the electric power input/output terminal 450. In addition, the control section of the switching unit 430 may set the contactor to be in an OFF state (blocked state) when, for example, a security signal input to the signal input unit 410 is a disable signal (invalidation signal) for disabling an electrical connection of the power storage unit 420 to the electric power input/output terminal 450.

Accordingly, since the switching unit 430 does not enable an electrical connection of the power storage unit 420 to the electric power input/output terminal 450 as long as the signal input unit 410 does not receive a security signal including an enable signal (release signal), it is possible to guarantee appropriate use of the battery device 40 to some extent when the battery device 40 is removed from the vehicle 10 and secondarily used.

In addition, a security signal received by the signal input unit 410 may include a disable signal (invalidation signal). The disable signal (invalidation signal) is a signal for disabling an electrical connection of the power storage unit 420 to the electric power input/output terminal 450. In that case, the signal input unit 410 may perform control such that the switching unit 430 disables an electrical connection of the power storage unit 420 to the electric power input/output terminal 450. Accordingly, even in a situation in which the battery device 40 is removed from the vehicle 10 and thus can be secondarily used, unnecessary secondary use can be prevented, and appropriate use when the battery device 40 is secondarily used can be guaranteed to some extent.

The control section of the switching unit 430 may have an internal memory storing predetermined identification information, may control the contactor when identification information included in a security signal matches the identification information stored in the internal memory, and may not control the contactor when the identification information does not match. "Match" may include that the two pieces of information exactly match in terms of details, partially match, can be combined to decrypt encrypted information, and the like. The control section of the switching unit 430 will be assumed to require matching of identification information hereinbelow. The internal memory is mounted in the battery device 40 in a secure state in which reading from outside is likely to be difficult.

Figure 3:
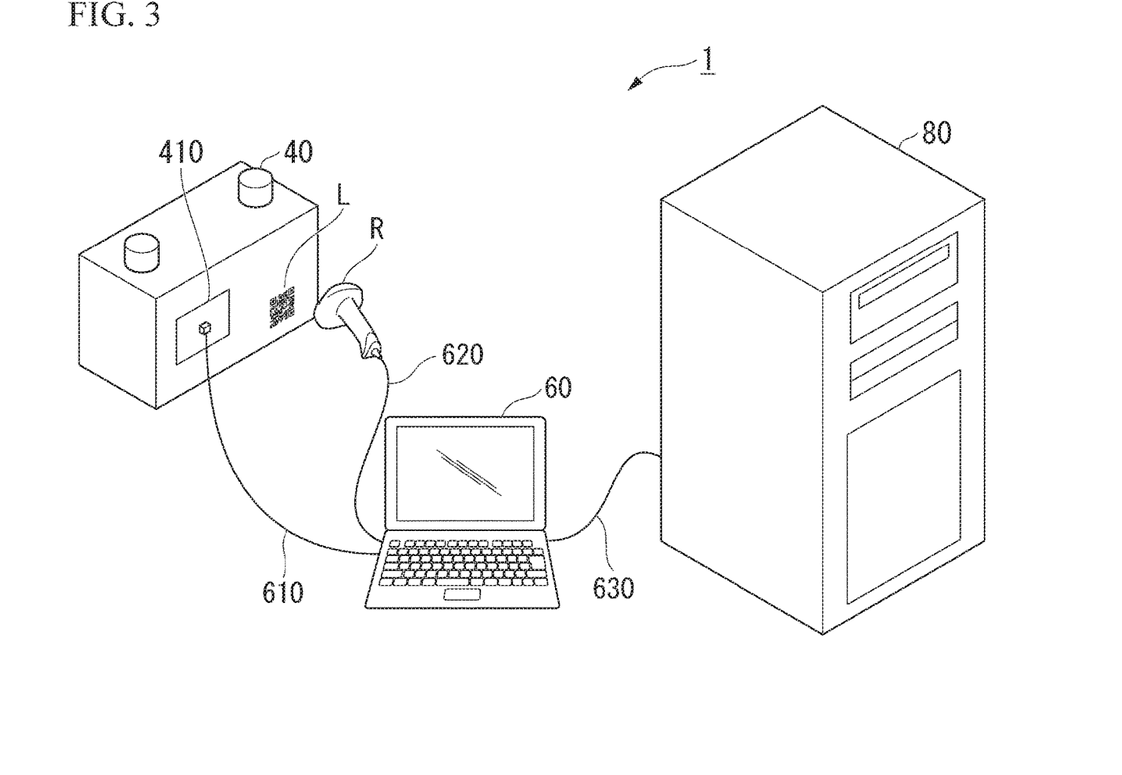
FIG. 3 is a configuration diagram of a battery management system 1 within a facility operated by an automobile manufacturer or the like according to the first embodiment of the present invention.

FIG. 3 is a configuration diagram of a battery management system 1 within a facility operated by an automobile manufacturer or the like.

The battery management system 1 includes the battery device 40, an administrator terminal device 60, and an administrator server device 80. The administrator terminal device 60 is connected to the battery device 40 via a wired communication medium 610. A reader/writer R is connected to the administrator terminal device 60. In addition, the administrator terminal device 60 is connected to the administrator server device 80 via a wired communication medium 620. Identification information is retained by, for example, the administrator server device 80 such as the automobile manufacturer.

Code information L, for example, a serial number, a QR code (registered trademark), or the like is given to an exterior part of the battery device 40 by means of printing, attaching a sticker, stamping, or the like. In a facility operated by an administrator, encoded data can be acquired by inputting the serial number to the battery device 40 from the administrator terminal device 60 or reading the QR code from the battery device 40 using the reader/writer R. The administrator terminal device 60 is a device, for example, which can receive a connection of a cable connected to the signal input unit 410 of the battery device 40 and communicate with the administrator server device 80.

Upon acquiring the above-described data from the administrator terminal device 60, the administrator server device 80 returns identification information to the administrator terminal device 60. The administrator terminal device 60 inputs the identification information acquired from the administrator server device to the signal input unit 410 of the battery device 40 as a security signal. The control section of the switching unit 430 sets the contactor to be in the ON state (conduction state) when, for example, the identification information input to the signal input unit 410 matches the battery device 40's own identification information.

Accordingly, as long as the battery device 40's own identification information does not match the identification information input as the security signal, the switching unit 430 does not enable an electrical connection of the power storage unit 420 to the electric power input/output terminal 450, and thus secondary use of the battery can be restricted. Therefore, when the battery device 40 is removed from the vehicle 10 and secondarily used, the administrator terminal device can guarantee appropriate use of the battery device 40 to some extent.

In addition, the control section of the switching unit 430 may set the contactor to be in the OFF state (blocked state) when, for example, the identification information input to the signal input unit 410 does not match the battery device 40's own identification information. Accordingly, as long as the battery device 40's own identification information does not match the identification information input as the security signal, the switching unit 430 does not enable an electrical connection of the power storage unit 420 to the electric power input/output terminal 450, and thus secondary use of the battery can be restricted. Therefore, when the battery device 40 is removed from the vehicle 10 and secondarily used, the administrator terminal device can guarantee appropriate use of the battery device 40 to some extent.

In addition, the communication device 50 may acquire battery usage information such as current values, voltage values, temperatures, and the like output from the battery sensor 42 and transmit the battery usage information to the administrator server device 80. The administrator terminal device 60 may acquire the battery usage information from the administrator server device 80 and input the battery usage information to an apparatus in which the battery device 40 will be installed (secondary use apparatus). By doing this, the secondary use apparatus can acquire an appropriate control mode for the battery device 40 before use and thus can appropriately use the battery device 40. Here, the control mode includes an upper limit and a lower limit of an SOC, an upper limit of a charging/discharge rate, and the like.

Here, when the secondary use apparatus controls the battery device 40 without considering a state of the battery, deterioration of the power storage unit 420 of the battery device 40 may progress rapidly. Therefore, when the battery device 40 is removed from the vehicle 10 and secondarily used, appropriate use in the secondary use can be guaranteed to some extent by enabling the secondary use based on a state of the battery device 40. According to the battery device 40 and the battery management system 1 of the above-described first embodiment, appropriate use of the battery device 40 when the battery device 40 is secondarily used can be guaranteed to some extent.

Second Embodiment

Figure 4:
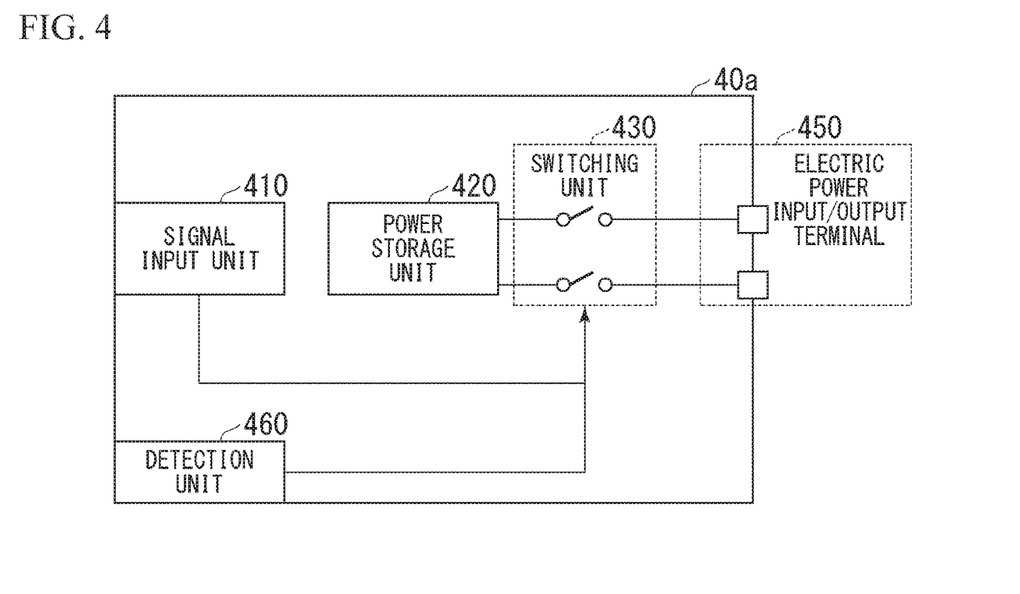
FIG. 4 is a configuration diagram of a battery device 40a according to a second embodiment of the present invention.

Next, a second embodiment will be described. FIG. 4 is a configuration diagram of a battery device 40a according to a second embodiment of the present invention. The battery device 40a further includes a detection unit 460 as illustrated in FIG. 4, unlike the battery device 40 of the first embodiment.

The detection unit 460 detects whether the battery device 40a is attached to the vehicle 10. The detection unit 460 operates at all times by receiving supply of weak electric power from the power storage unit 420. The detection unit 460 may be, for example, a mechanical sensor. The mechanical sensor may be installed on a contact surface of a part of the battery device 40*a* attached to the vehicle 10. The mechanical sensor may detect whether the battery device 40*a* has been removed from the vehicle 10 by measuring stress applied when the battery device 40*a* is attached to the vehicle 10 or the like and stress applied when the battery device 40*a* is removed from the vehicle 10 or the like.

In addition, the detection unit 460 may be a photoelectric conversion element. The photoelectric conversion element may be installed on contact surface of the part of the battery device 40*a* attached to the vehicle 10. The photoelectric conversion element may detect visible light when the battery device 40*a* is removed from the vehicle 10 and thereby detect the removal of the battery device 40 from the vehicle 10.

When the removal of the battery device 40*a* from the vehicle 10 is detected, the detection unit 460 outputs a signal indicating the detection result to the switching unit 430. The switching unit 430 disables an electrical connection of the power storage unit 420 to the electric power input/output terminal 450 on the basis of the detection result.

In addition to the above description, the control section of the switching unit 430 enables an electrical connection of the power storage unit 420 to the electric power input/output terminal 450 on the basis of a security signal input to the signal input unit 410. Further, even when the detection unit 460 detects a detection result indicating that the battery device 40*a* has been removed from the vehicle 10 and then the signal input unit 410 receives a security signal including an enable signal (release signal), the signal input unit 410 performs control of enabling an electrical connection of the power storage unit 420 to the electric power input/output terminal 450 on the basis of the security signal. Accordingly, appropriate use when the battery device 40*a* is secondarily used can be guaranteed to some extent.

In addition, when an apparatus to which the battery device 40*a* is attached controls the battery device 40 without considering a state of the battery, deterioration of the power storage unit 420 of the battery device 40*a* may progress rapidly. Meanwhile, according to the present embodiment, when removal of the battery device 40*a* from the vehicle 10 is detected, the detection unit 460 outputs a signal indicating the detection result to the switching unit 430, and the switching unit 430 disables an electrical connection of the power storage unit 420 to the electric power input/output terminal 450 on the basis of the detection result.

Accordingly, the power storage unit 420 of the battery device 40*a* can be prevented from rapid deterioration caused by controlling the battery device 40*a* without considering states of the battery. Therefore, when the battery device 40*a* is removed from the vehicle 10 and secondarily used, appropriate use of the battery device 40*a* can be guaranteed to some extent.

Third Embodiment

Figure 5:
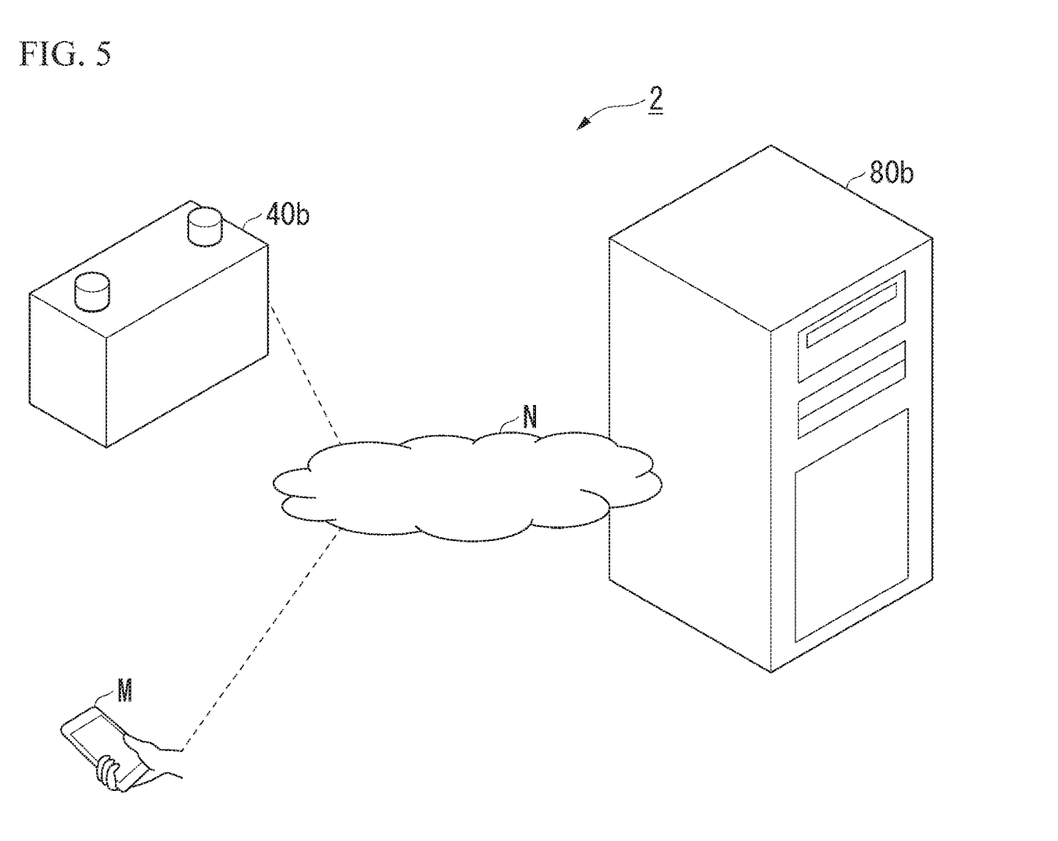
FIG. 5 is a configuration diagram of a battery control system 2 according to a third embodiment of the present invention.

A battery device 40*b* according to a third embodiment of the present invention will be described using FIGS. 5 and 6. Processes of a third embodiment will be described focusing on differences from the first and the second embodiments. FIG. 5 illustrates a configuration diagram of a battery control system 2 according to the third embodiment. In the battery control system 2, the battery device 40*b* is connected to a wireless communication terminal M through a wireless communication network N. An administrator server device 80*b* may be connected to the wireless communication network N.

The wireless communication network N may be a wireless LAN or the like including Wi-Fi (registered trademark) or Bluetooth (registered trademark) within a facility operated by an automobile manufacturer. In the present embodiment, for example, the battery device 40*b* is assumed to have been removed from the vehicle 10 or the like. Within a facility operated by an automobile manufacturer, for example, as long as the battery device 40*b* is connected to the wireless communication network N and authenticated by the administrator server device 80*b*, an employee of the automobile manufacturer operates the wireless communication terminal M and thereby can remotely operate the battery device 40*b* through the wireless communication network N.

Figure 6:
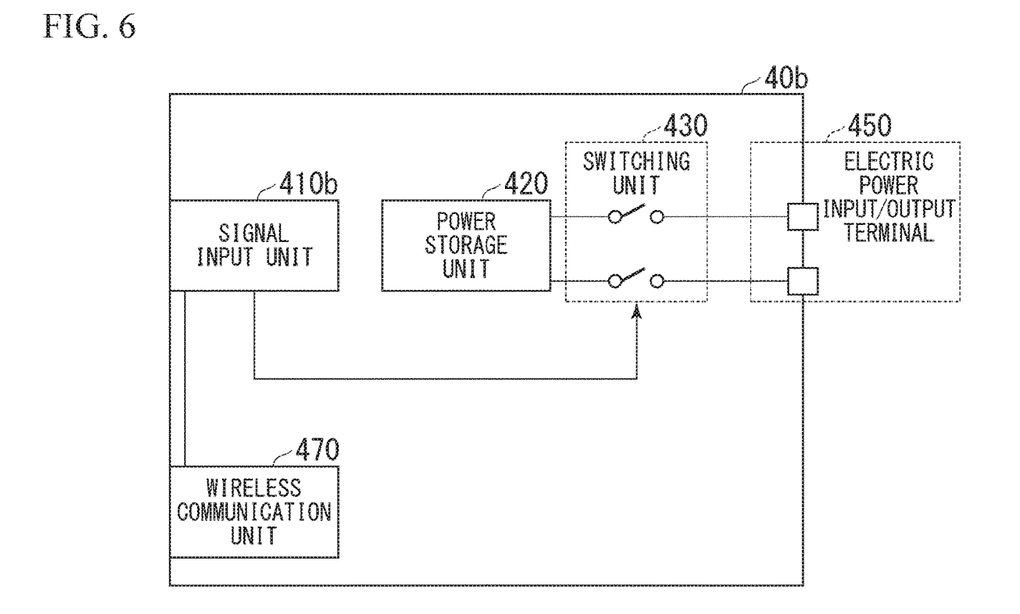
FIG. 6 is a configuration diagram of a battery device 40b according to the third embodiment of the present invention.

FIG. 6 is a configuration diagram of the battery device 40*b* according to the third embodiment. The battery device 40*b* further includes a wireless communication unit 470, unlike the battery device 40 of the first embodiment. The wireless communication unit 470 transmits and receives radio signals through the wireless communication network N. In addition, the wireless communication unit 470 can receive a security signal as a radio signal. The wireless communication unit 470 may output the received security signal to a signal input unit 410*b*. Subsequent processes are similar to those of the first and the second embodiments.

Accordingly, since the switching unit 430 does not enable an electrical connection of the power storage unit 420 to the electric power input/output terminal 450 as long as the battery device 40*b* is not connected to the wireless communication network N and authenticated by the administrator server device 80*b* and the signal input unit 410 does not receive the security signal, even when the battery device 40*b* is removed from the vehicle 10 and secondarily used, appropriate use of the battery device 40*b* can be guaranteed to some extent.

In addition, the battery device 40*b* may not be connected to the wireless communication network N when a security signal is input as a radio signal to the wireless communication unit 470. As long as a user is within the facility operated by the automobile manufacturer, for example, the user may include a security signal in an RF tag and input the security signal to the wireless communication unit 470 through non-contact near field wireless communication. Accordingly, even when the battery device 40*b* is removed from the vehicle 10 and secondarily used, appropriate use of the battery device 40*b* can be guaranteed to some extent.

Fourth Embodiment

Figure 7:
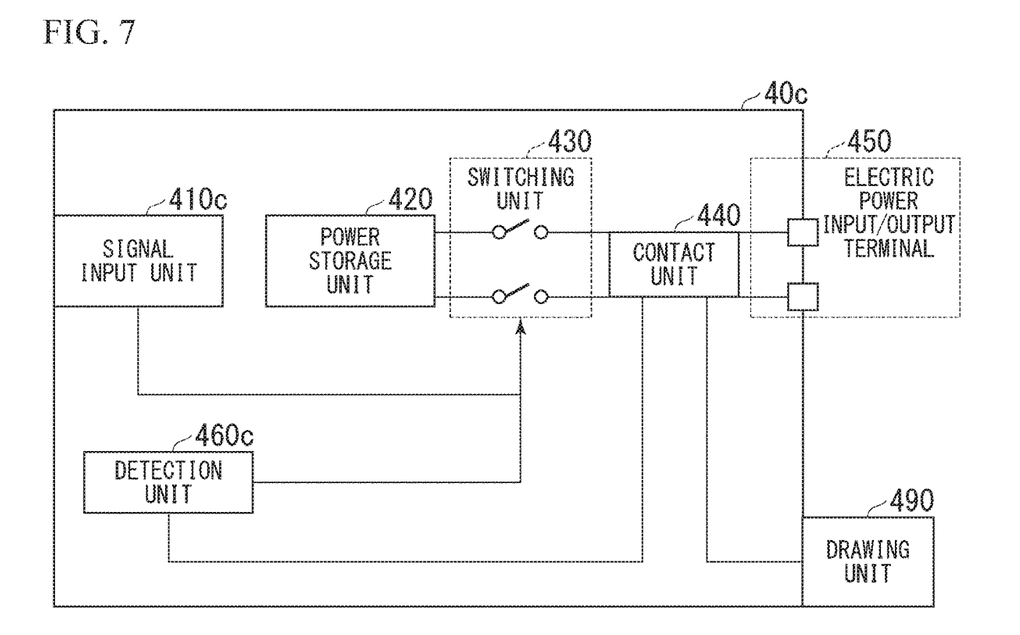
FIG. 7 is a configuration diagram of a battery device 40c according to a fourth embodiment of the present invention.

A battery device 40*c* according to a fourth embodiment of the present invention will be described using FIG. 7. Processes of the fourth embodiment will be described focusing on differences from the first to the third embodiments. FIG. 7 illustrates a configuration diagram of the battery device 40*c* according to the fourth embodiment of the present invention. The battery device 40*c* further includes a contact unit 440 and a drawing unit 490, unlike the battery device 40*a* of the second embodiment.

Here, the contact unit 440 is physically connected to the drawing unit 490 using a wire or the like. The drawing unit 490 is disposed outside the battery device 40*c*, or may be attached to the vehicle 10. The contact unit 440 constitutes a part of an electric power path between the power storage unit 420 and the electric power input/output terminal 450, and thus the power storage unit 420 and the electric power input/output terminal 450 are electrically disconnected by removing the contact unit.

When the drawing unit 490 is pulled out from outside, the contact unit 440 is removed from the battery device 40*c* as well or removed from the electric power path between the power storage unit 420 and the electric power input/output terminal 450. As a result, even if the switching unit 430 is in an ON state, it is not possible to use the battery device 40*c* as a battery. Accordingly, even in a situation in which the battery device 40*c* is removed from the vehicle 10 and can be secondarily used, unnecessary secondary use can be prevented and appropriate use of the battery device 40*c* can be guaranteed to some extent. Further, it is preferable to set a mode in which the removed contact unit 440 is not restored without using a special tool.

Fifth Embodiment

Figure 8:
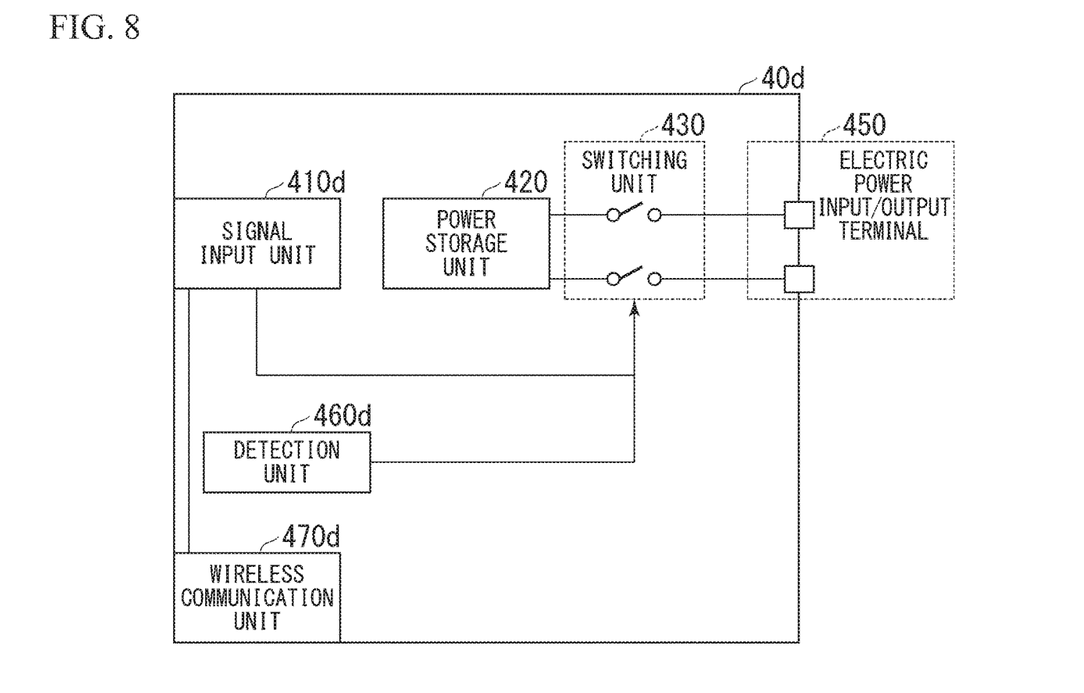
FIG. 8 is a configuration diagram of a battery device 40d according to a fifth embodiment of the present invention.

Further, the above-described embodiments may be appropriately combined, and for example, the battery device according to the above-described first embodiment or fourth embodiment can also be applied to the battery control system 2 according to the third embodiment. For example, the battery device 40*b* of the battery control system 2 illustrated in FIG. 5 may be replaced with a battery device 40*d*. FIG. 8 is a configuration diagram of the battery device 40*d* according to a fifth embodiment. The battery device 40*d* further includes a wireless communication unit 470*d*, unlike the battery device 40*a* of the second embodiment.

Operations of each of a signal input unit 410*d*, the power storage unit 420, the switching unit 430, the electric power input/output terminal 450, a detection unit 460*d*, and the wireless communication unit 470*d* included in the battery device 40*d* are as described in the first to the third embodiments. Therefore, appropriate use of the battery device 40*d* in secondary use of the battery device 40*d* can be guaranteed to some extent.

Sixth Embodiment

Figure 9:
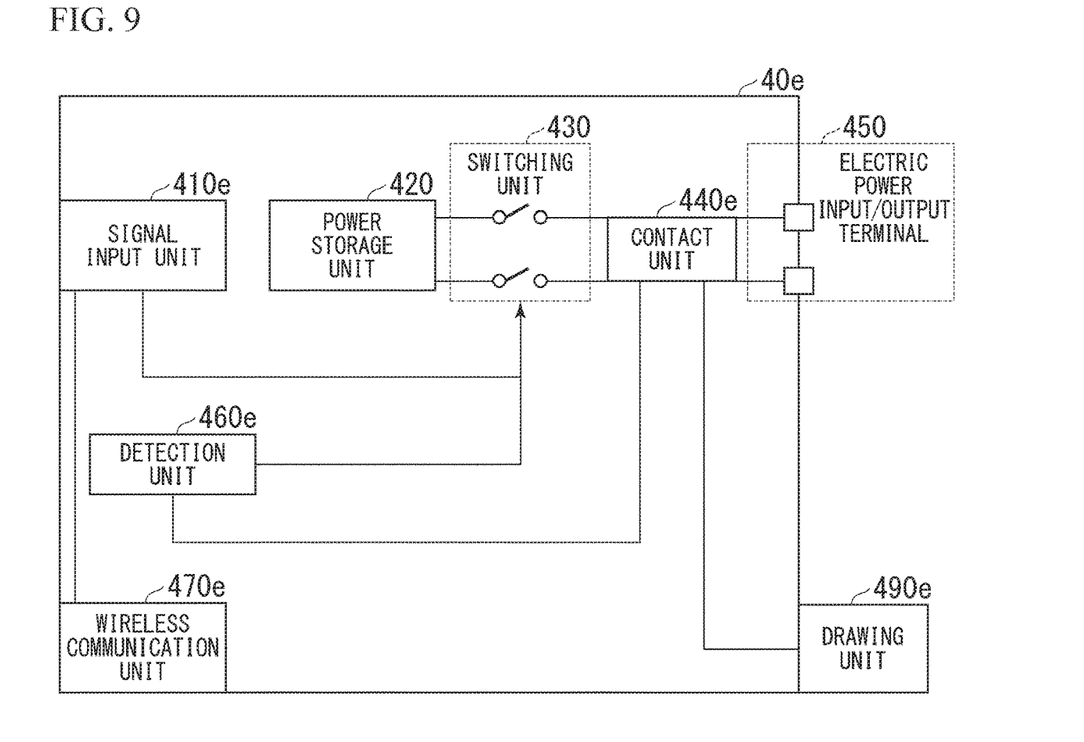
FIG. 9 is a configuration diagram of a battery device 40e according to a sixth embodiment of the present invention.

In addition, the battery device 40*b* of the battery control system 2 illustrated in FIG. 5 may be replaced with a battery device 40*e*. FIG. 9 is a configuration diagram of the battery device 40*e* according to a sixth embodiment. The battery device 40*e* further includes a contact unit 440*e*, a wireless communication unit 470*e*, and a drawing unit 490*e*, unlike the battery device 40*d* of the fifth embodiment. Operations of a signal input unit 410*e*, the power storage unit 420, the switching unit 430, the contact unit 440*e*, the electric power input/output terminal 450, a detection unit 460*e*, the wireless communication unit 470*e*, and the drawing unit 490*e* included in the battery device 40*e* are as described in the first to the fifth embodiments. Therefore, appropriate use of the battery device 40*e* in secondary use of the battery device can be guaranteed to some extent.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. A battery management system for guaranteeing appropriate use during secondary use comprising:
    a battery device;
    an administrator terminal device; and
    an administrator server device,
    wherein the battery device comprises:
        a power storage unit;
        a signal input unit to which a security signal is input; and
        a switching unit configured to enable or disable an electrical connection of the power storage unit to an electric power input/output terminal according to a signal input to the signal input unit,
    wherein, when the electrical connection of the power storage unit to the electric power input/output terminal is enable, the administrator terminal device acquires battery usage information from the administrator server device and inputs the battery usage information to a secondary use apparatus in which the battery device is installed.

2. The battery management system according to claim 1, wherein, when a release signal that is one type of the security signal is input to the signal input unit, the switching unit enables the electrical connection of the power storage unit to the electric power input/output terminal.

3. The battery management system according to claim 1, wherein, when the security signal input to the signal input unit matches identification information associated with the battery device, the switching unit enables the electrical connection of the power storage unit to the electric power input/output terminal.

4. The battery management system according to claim 1, wherein the switching unit disables the electrical connection of the power storage unit to the electric power input/output terminal when the battery device is removed from a mobile object.

5. The battery management system according to claim 1, further comprising:
    a wireless communication unit configured to receive a radio signal including the security signal.

6. The battery management system according to claim 1, wherein the switching unit disables the electrical connection of the power storage unit to the electric power input/output terminal by pulling out a predetermined member from a connection element provided between the power storage unit and the electric power input/output terminal when the battery device is removed from a mobile object.

* * * * *